O. C. SPANENBERG.
PIVOTAL SPRING SEAT.
APPLICATION FILED DEC. 31, 1921.
1,429,979.
Patented Sept. 26, 1922.
2 SHEETS—SHEET 1.
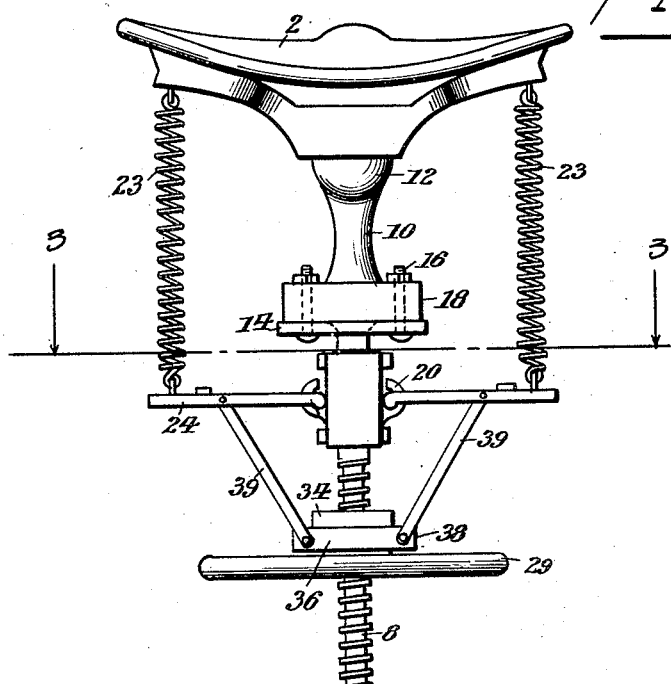
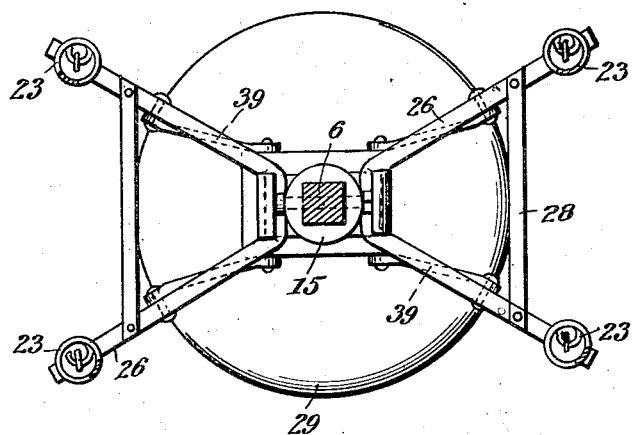
Inventor
O. C. Spanenberg
By William J. Jacobi
Attorney

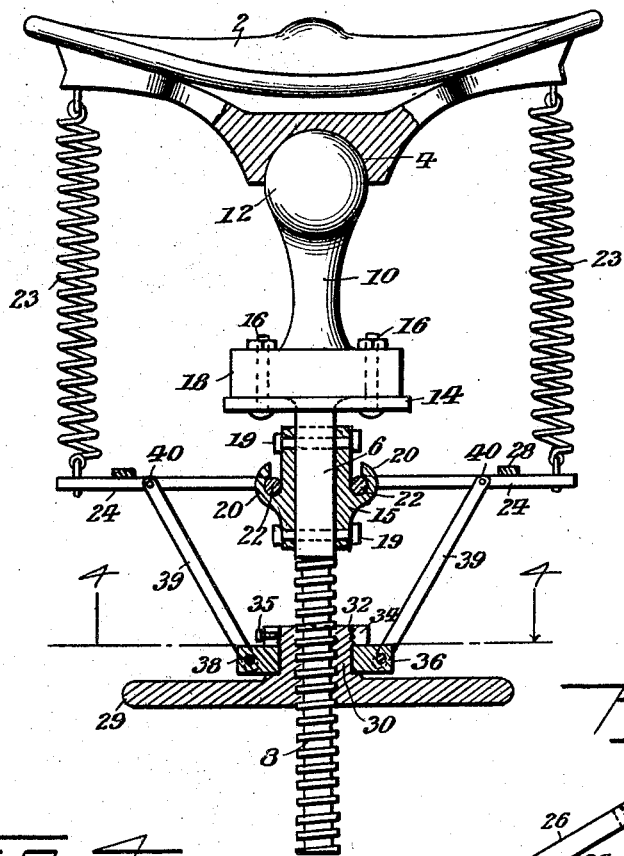
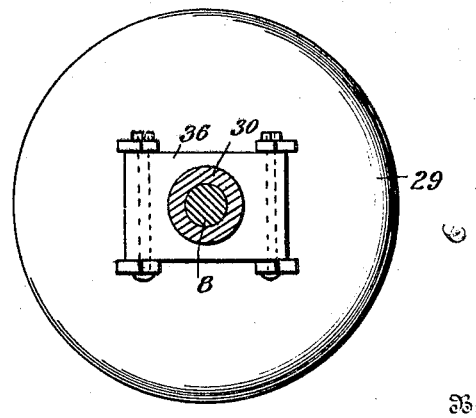
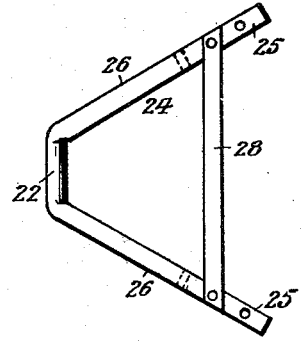

Patented Sept. 26, 1922.

1,429,979

UNITED STATES PATENT OFFICE.

OTTO C. SPANENBERG, OF ALBION, MICHIGAN.

PIVOTAL SPRING SEAT.

Application filed December 31, 1921. Serial No. 526,098.

*To all whom it may concern:*

Be it known that OTTO C. SPANENBERG, a citizen of the United States, residing at Albion, in the county of Calhoun and State of Michigan, has invented certain new and useful Improvements in Pivotal Spring Seats, of which the following is a specification.

The present invention relates to seats for farm implements such as plows, harrows, wheel cultivators and the like and is designed to provide a construction in which the seat possesses the easy riding qualities of a spring seat.

The principal object of my invention is to provide a seat, which, while embodying a structure of the requisite rigidity and stability, yet is capable of yielding on a pivotal support so as to overcome shocks incident to a seat which is combined with an agricultural implement.

It is a further object of the invention to provide a seat so arranged that it may yieldingly adjust itself when carrying the weight of the operator to a substantially horizontal position irrespective of the position of the frame or wheels of the implement especially when the latter is travelling over irregular ground surface.

It is a further object to provide a seat mounted upon a pivotal support in which the springs which normally support the seat, at the corners thereof may be placed under varying tension.

Referring to the accompanying drawings forming a part of this specification,

Figure 1 is a side elevation of the seat;

Figure 2 is a view partly in section and partly in elevation of the seat as shown in Figure 1;

Figure 3 is a horizontal section on the line 3—3 of Figure 1, looking in the direction of the arrows;

Figure 4 is a horizontal section through the lower portion of the seat on the line 4—4 of Figure 2, looking in the direction of the arrows and Figure 5 is a plan view of one of the tension arms.

Referring now more particularly to the drawings by numerals of reference in which the numerals designate like parts throughout the several figures, a seat, usually of cast iron, is indicated at 2, said seat being provided centrally on its under face with a ball socket 4, which may be formed in a part integrally cast with the seat proper, or may, if desired, be formed in a separate casting, bolted or otherwise secured to the under face of the seat, this detail being a matter of preference with the manufacturer and does not depart from the spirit of the invention.

For the purpose of supporting the seat, I provide a standard or pedestal 6 which is screw threaded at 8 at its lower portion and is provided at its upper end with a post 10 terminating in a ball 12 which lies or fits snugly within the socket 4 on seat 2, and thereby provides between said seat and post a ball and socket joint or universal connection.

For the purpose of mounting the seat upon the vehicle or agricultural implement, the upper end of the usual spring bar 14 is clamped securely by bolts 16 to the under face of a squared base 18 of the post 10, the said bar being provided with an aperture to permit the passage of the pedestal 6 therethrough when the seat is being assembled.

Preferably, immediately below the spring bar 14, the pedestal 6 is provided with a collar 15 secured thereto against relative longitudinal and rotary movement through the medium of bolts 19, the pedestal at its point of connection with the collar being preferably, but not necessarily, of rectangular cross section, the bore of the collar, of course, being squared.

The collar 15 is provided with integral, diametrically opposite lugs 20 which extend upwards, and are inturned to provide trunnions which support the inner ends 22 of tension members 24, the arms 26, of which diverge so that the ends thereof define the corners of a rectangle, which ends are disposed respectively beneath the corners of the seat.

Connecting respectively, each of the arms at its end 25 with the under portion of the seat adjacent its edge, at a point substantially above its connection with said arm, is a coil spring 23 normally under tension. A brace bar 28 spans the arms 26.

For the purpose of regulating or adjusting the tension of the coil springs 23 simultaneously, I provide a manually operated tension wheel 29 which is internally threaded for cooperation with the threaded portion 8 of pedestal 6, said wheel having a circular hub 30 which is screw-threaded at its upper portion at 32 to receive a nut 34 locked by means of a set screw 35.

Surrounding the hub 30 for relative rotary movement is a tension block 36, constrained against upward movement with respect to said wheel 29 through the medium of said nut 34, said block having pivoted thereto through the medium of transverse bolts 38, the lower ends of tension levers 39, the upper ends of which are pivotally connected at 40, respectively with the tension arms intermediate their ends.

It will thus be observed that movement of the tension wheel 29 on the pedestal 6 causes the tension arms to rock on their trunnions and thereby increases or decreases the tension of the springs depending upon the direction of movement of said wheel.

What is claimed is:

1. In a seat construction, a supporting pedestal having a lower screw-threaded portion, a seat pivotally secured at approximately its central lower portion to the upper end of said pedestal, tension arms pivotally secured to said pedestal below said seat, a spring member connected with each of said arms and with the seat adjacent its edge, a tension wheel rotatable on said lower screw-threaded portion and links pivotally connected respectively with said tension wheel and said tension arms, whereby rotation of said wheel rocks said arms on their pivots simultaneously to increase or decrease the tension of said springs.

2. In a seat construction, a supporting pedestal having a lower screw-threaded portion, a post rising from said pedestal and having a ball-shaped end, a seat having a centrally arranged socket cooperating with said ball-shaped end to pivotally support said seat, a collar secured to said pedestal intermediate said post and screw-threaded portion and having oppositely arranged recesses, tension arms pivoted at their inner ends in said recesses, a spring connecting the outer end of each of said arms with the under side of said seat adjacent its edge, a tension wheel screwed and rotatably mounted on said screw-threaded portion, a block loosely secured on and for relative rotary movement with respect to said tension wheel, and links pivotally connected at their ends respectively with said block and said tension arms.

In testimony whereof I affix my signature.

OTTO C. SPANENBERG.